United States Patent
Itohara et al.

(10) Patent No.: US 8,897,396 B2
(45) Date of Patent: Nov. 25, 2014

(54) PULSE RECEIVER AND METHOD FOR RECEIVING BURST SIGNAL

(75) Inventors: Hiroyuki Itohara, Tokyo (JP); Kazutaka Kamimura, Tokyo (JP); Yasushi Aoyagi, Tokyo (JP)

(73) Assignees: Furukawa Electric Co., Ltd., Tokyo (JP); Furukawa Automotive Systems Inc., Inukami-gun (JP)

( * ) Notice: Subject to any disclaimer, the term of this patent is extended or adjusted under 35 U.S.C. 154(b) by 83 days.

(21) Appl. No.: 13/586,254

(22) Filed: Aug. 15, 2012

(65) Prior Publication Data

US 2012/0307940 A1    Dec. 6, 2012

Related U.S. Application Data

(63) Continuation of application No. PCT/JP2011/053173, filed on Feb. 15, 2011.

(30) Foreign Application Priority Data

Feb. 19, 2010    (JP) ................................ 2010-034548

(51) Int. Cl.
  *H04L 25/06*   (2006.01)
  *H04B 1/7163*  (2011.01)
(52) U.S. Cl.
  CPC ................................ *H04B 1/71637* (2013.01)
  USPC ........... 375/319; 375/317; 375/340; 398/202; 398/206; 398/209
(58) Field of Classification Search
  CPC .............. H04B 1/71637; H04L 27/183; H04L 27/3488; H04L 1/0054; H04L 1/007; H04L 27/38; H04L 1/0047; H04L 1/0045; H04L 27/2649; H04L 27/3405; H04L 1/0026; H04L 1/20; H04L 2027/0095
  USPC ................... 375/317, 319, 340, E7.011, 324, 375/E7.001, 298, 279, 280, 308, 329, 375/E7.012, 260, 271, 229, 232, 264, 341, 375/342, 350, 364, 287, 349, 286; 455/73, 455/130; 341/61; 398/202, 25; 714/704
  See application file for complete search history.

(56) References Cited

U.S. PATENT DOCUMENTS 4,464,765 A * 8/1984 Shimizu ........................ 375/292
4,618,955 A * 10/1986 Sharpe et al. .................. 714/761

(Continued)

FOREIGN PATENT DOCUMENTS

JP    05-129862    5/1993
JP    09-083580    3/1997

(Continued)

OTHER PUBLICATIONS

Ohtsuki, T.; Kahn, J.M., "BER performance of turbo-coded PPM CDMA systems on optical fiber," Lightwave Technology, Journal of, vol. 18, No. 12, pp. 1776,1784, Dec. 2000.*

(Continued)

*Primary Examiner* — Daniel Washburn
*Assistant Examiner* — Amneet Singh
(74) *Attorney, Agent, or Firm* — Oblon, Spivak, McClelland, Maier & Neustadt, L.L.P.

(57) ABSTRACT

Provided is a pulse receiver capable of receiving a burst signal and decoding the burst signal with a bit error rate reduced to a target value or less by controlling a determination threshold such that decoding success rate is equal to or less than a predetermined value. A decode unit 140 decodes a pulse train 20 to information 30, counts the number of decoding successes for a predetermined time period and outputs the counted number (decoding success rate DR) to a control unit 150. The control unit 150 uses as a basis the decoding success rate DR communicated from the decode unit 140 to control the set value of reference voltage Vth used in the comparator 130.

6 Claims, 6 Drawing Sheets

(56) References Cited

U.S. PATENT DOCUMENTS

| | | | |
|---|---|---|---|
| 5,001,726 A * | 3/1991 | Kawai et al. | 375/317 |
| 5,274,674 A * | 12/1993 | Lafon | 375/317 |
| 5,781,588 A * | 7/1998 | Abe et al. | 375/334 |
| 5,987,075 A * | 11/1999 | Abe et al. | 375/334 |
| 6,678,337 B1 | 1/2004 | Sugita | |
| 7,173,551 B2 * | 2/2007 | Vrazel et al. | 341/144 |
| 7,602,860 B2 * | 10/2009 | Hietala et al. | 375/317 |
| 8,023,430 B2 * | 9/2011 | Ono | 370/252 |
| 2002/0196510 A1 * | 12/2002 | Hietala et al. | 359/189 |
| 2003/0202805 A1 * | 10/2003 | Taga et al. | 398/202 |
| 2004/0165894 A1 | 8/2004 | Taga et al. | |
| 2004/0165895 A1 * | 8/2004 | Taga et al. | 398/202 |
| 2008/0115031 A1 * | 5/2008 | Shen | 714/755 |
| 2008/0225958 A1 * | 9/2008 | Park et al. | 375/240.25 |
| 2010/0014866 A1 * | 1/2010 | Kang et al. | 398/99 |
| 2011/0164874 A1 * | 7/2011 | Zhang | 398/38 |

FOREIGN PATENT DOCUMENTS

| | | |
|---|---|---|
| JP | 10-164147 | 6/1998 |
| JP | 2000-59269 | 2/2000 |
| JP | 2000-341344 | 12/2000 |

OTHER PUBLICATIONS

Walklin, S.; Conradi, J., "Multilevel signaling for increasing the reach of 10 Gb/s lightwave systems," Lightwave Technology, Journal of, vol. 17, No. 11, pp. 2235,2248, Nov. 1999.*

Wedding, B.; Pohlmann, W.; Franz, B.; Geupel, H., "Multi-level dispersion supported transmission at 20 Gbit/s over 46 km installed standard singlemode fibre," Optical Communication, 1996. ECOC '96. 22nd European Conference on , vol. 1, no., pp. 91,94 vol. 1, 19-Sep. 19, 1996.*

International Search Report issued on Mar. 29, 2011 for PCT/JP2011/053173 filed on Feb. 15, 2011 (with partial English translation of categories).

International Telecommunication Union, ITU-T G.992.1 (Jun. 1999), Series G: Transmission Systems and Media, Digital Systems and Networks, Digital transmission systems—Digital sections and digital line system—Access networks, Asymmetric digital subscriber line (ADSL) transceivers.

Office Action issued Dec. 25, 2013 in Chinese Patent Application No. 201180008586.0 with English language translation.

* cited by examiner

Loss of transmission channel (attenuation amount) [dB]

Reception level [dBm]

PULSE RECEIVER AND METHOD FOR RECEIVING BURST SIGNAL

TECHNICAL FIELD

The present invention relates to a pulse receiver which receives a burst signal composed of plural pulses and controls to realize an optimal state for demodulation, and also to a method for receiving such a burst signal.

BACKGROUND ART

In a receiver used in wireless communications, any of the following signal processing methods are performed in order to keep the reception signal to a constant level.
(1) Performing automatic gain control (AGC) on an amplifier in response to the reception level and keeping the input level of the reception signal to a demodulator constant (Patent Literature 1)
(2) Adding a pilot signal different from a main signal in frequency and monitoring only the pilot signal thereby to perform the above-mentioned AGC (Non-Patent Literature 1).
(3) Generating and transmitting a training signal with a unique word, receiving and demodulating the signal thereby to determine the bit error rate so as to control a threshold or AGC (Patent Literature 2).

As to the above-mentioned (1), the system of controlling a variable attenuator in a reception signal input unit by monitoring an error rate correction degree of a reception demodulated signal or monitoring the reception level of a reception signal (baseband signal) so as to demodulate the reception signal in the radio receiver in s stable manner is disclosed in the patent literature 1. Besides, as to the above-mentioned (2), the ADSL of determining a specific fixed frequency, for example, 276 kHz as a pilot frequency, monitoring the reception level of the specific frequency constantly thereby to estimate the transmission state of a main signal and controlling the reception level to be optimal according to need is disclosed in the non-patent literature 1. Further, as for the above-mentioned (3), the system of inserting a pilot signal with a known unique word into a transmission signal periodically over plural periods by a transmitter, monitoring the pilot signal contained in a reception signal by a receiver and determining the reception state of the signal thereby to correct and demodulate the data is disclosed in the patent literature 2.

CITATION LIST

Patent Literature

PL1: Japanese Patent Application Laid-Open No. 1993 (H05)-129862
PL2: Japanese Patent Application Laid-Open No. 2000-059269

Non-Patent Literature

NPL1: ITU-T G992.1 Asymmetrical Digital Subscriber Line (ADSL) Transceivers.

SUMMARY OF INVENTION

Technical Problem

However, the above-mentioned conventional systems of keeping the reception signal level constant are all premised on the continuous data transfer, and are systems of monitoring reception signal level continuously, inserting a pilot signal or a specific data pattern to monitor the reception level and bit error rate thereby to control the receiver optimally or correcting data. For example, in control of an AGC circuit disclosed in the patent literature 1, it is necessary to detect the level of a reception signal and also to make high-speed control of the AGC circuit, and it is difficult in view of characteristics of the wave detector to detect the reception signal level of the burst signal that uses short pulses.

Besides, in the method disclosed in the non-patent literature 1 of estimating a transmission state of a main signal by a pilot signal and controlling an amplifier and a threshold, it is necessary to monitor the pilot signal which is transmitted with a frequency different from that of the main signal, and a special monitoring circuit is required.

Further, in the system disclosed in the patent literature 2 of inserting a unique word, transmitting by a transmitter and extracting the unique word by a receiver, it is necessary to insert the unique word repeatedly at a fixed time interval, which is not suitable for burst communication.

The present invention was carried out so as to solve the above-mentioned problems, and aims to provide a pulse receiver capable of receiving a burst signal and decoding the burst signal with a bit error rate minimized to a target value or less by controlling a determination threshold such that decoding success rate is equal to or greater than a predetermined value.

Solution to Problem

In order to solve the above-mentioned problems, a first aspect of a pulse receiver of the present invention is a pulse receiver for receiving a burst signal containing information to transfer and decoding and outputting the information, comprising: a comparator provided for comparing the burst signal with a reference voltage and outputting a pulse train corresponding to the burst signal; a decode unit provided for receiving the pulse train from the comparator, decoding the pulse train to predetermined basic data sequentially and outputting the data as the information, and counting, for a predetermined count time, a decoding success rate which is a number of times of decoding of the pulse train to the basic data; and a control unit provided for receiving the decoding success rate from the decode unit, calculating a deviation by subtracting the decoding success rate from a predetermined decoding target rate, when the deviation is greater than a predetermined first determination value that is equal to or greater than 0, renewing a set value of the reference voltage so as to reduce the deviation and outputting the set value to the comparator, and repeating renewal of the set value of the reference voltage until the deviation becomes equal to or less than the first determination value.

As the reference voltage of the comparator is renewed based on the deviation between the decoding target rate and the decoding success rate in such a manner as to lower the deviation, it is possible to reduce the bit error rate (BER) to the target value or less to decode the burst signal.

A second aspect of the pulse receiver of the present invention is characterized in that, in the first aspect of the pulse receiver, when the deviation is greater than the first determination value, the control unit renews the set value by adding, to the set value, a proportional component obtained by multiplying the deviation by a predetermined proportional control constant and an integral component obtained by multiplying a cumulative value of the deviation by a predetermined integral control constant, and when the deviation is equal to or less than the first determination value and the cumulative value of the deviation is greater than a predetermined second determination value that is equal to or greater than 0, the control unit subtracts an offset value corresponding to an offset voltage from the set value and resets the cumulative value of the deviation to 0.

As the set value of reference voltage is renewed with the proportional component and integral component of the deviation, it is possible to make the set value of reference voltage converge smoothly and stably and to reduce the BER more by use of the set value of reference voltage from which a predetermined offset voltage is subtracted.

A third aspect of the pulse receiver of the present invention is characterized in that, in the first aspect of the pulse receiver, when the deviation is greater than the first determination value, the control unit renews the set value by adding, to the set value, a proportional component obtained by multiplying the deviation by a predetermined proportional control constant and an integral component obtained by multiplying a cumulative value of the deviation by a predetermined integral control constant.

As the set value of reference voltage is renewed with the proportional component and integral component of the deviation, it is possible to make the set value of reference voltage converge smoothly and stably.

A fourth aspect of the pulse receiver of the present invention is characterized in that, in the second aspect of the pulse receiver, the control unit sets, as an initial value, a set value of the reference voltage that is positive and greater as compared with the burst signal input to the comparator, the proportional control constant and the integral control constant are negative, and the offset voltage is positive.

A fifth aspect of the pulse receiver of the present invention is characterized in that, in the third aspect of the pulse receiver, the control unit sets, as an initial value, a set value of the reference voltage that is positive and greater as compared with the burst signal input to the comparator, and the proportional control constant and the integral control constant are negative.

A first aspect of a method for receiving a burst signal of the present invention is characterized by comprising: (a) receiving the burst signal containing information to transfer; (b) comparing the burst signal with a reference voltage and generating a pulse train corresponding to the burst signal; (c) decoding the pulse train to predetermined basic data sequentially and outputting the data as the information, and counting, for a predetermined count time, a decoding success rate which is a number of times of decoding of the pulse train to the basic data; and (d) calculating a deviation by subtracting the decoding success rate from a predetermined decoding target rate, when the deviation is greater than a predetermined first determination value that is equal to or greater than 0, renewing a set value of the reference voltage so as to reduce the deviation and setting the reference voltage to the set value, wherein the steps (a) to (d) are repeated until the deviation becomes equal to or less than the first determination value.

A second aspect of the method for receiving a burst signal of the present invention is characterized in that, in the first aspect of the method for receiving a burst signal, in the step (d), when the deviation is greater than the first determination value, the set value is renewed by adding, to the set value, a proportional component obtained by multiplying the deviation by a predetermined proportional control constant and an integral component obtained by multiplying a cumulative value of the deviation by a predetermined integral control constant, and the method further comprises (e), when the deviation is equal to or less than the first determination value and the cumulative value of the deviation is greater than a predetermined second determination value that is equal to or greater than 0, subtracting an offset value corresponding to an offset voltage from the set value and resetting the cumulative value of the deviation to 0.

A third aspect of the method for receiving a burst signal of the present invention is characterized in that, in the first aspect of the method for receiving a burst signal, in the step (d), when the deviation is greater than the first determination value, the set value is renewed by adding, to the set value, a proportional component obtained by multiplying the deviation by a predetermined proportional control constant and an integral component obtained by multiplying a cumulative value of the deviation by a predetermined integral control constant.

A fourth aspect of the method for receiving a burst signal of the present invention is characterized in that, in the second aspect of the method for receiving a burst signal, a set value of the reference voltage that is positive and greater as compared with the burst signal is set as an initial value of the set value, the proportional control constant and the integral control constant are negative, and the offset voltage is positive.

A fifth aspect of the method for receiving a burst signal of the present invention is characterized in that, in the third aspect of the method for receiving a burst signal, a set value of the reference voltage that is positive and greater as compared with the burst signal is set as an initial value of the set value, and the proportional control constant and the integral control constant are negative.

Advantageous Effects of Invention

According to the pulse receiver of the present invention, it is possible to receive a burst signal and decode the burst signal with a bit error rate reduced to a target value or less by controlling a determination threshold such that decoding success rate becomes equal to or greater than a predetermined value.

DESCRIPTION OF EMBODIMENTS

With reference to the drawings, a pulse receiver according to a preferred embodiment of the present invention will be

First Embodiment

Figure 1:
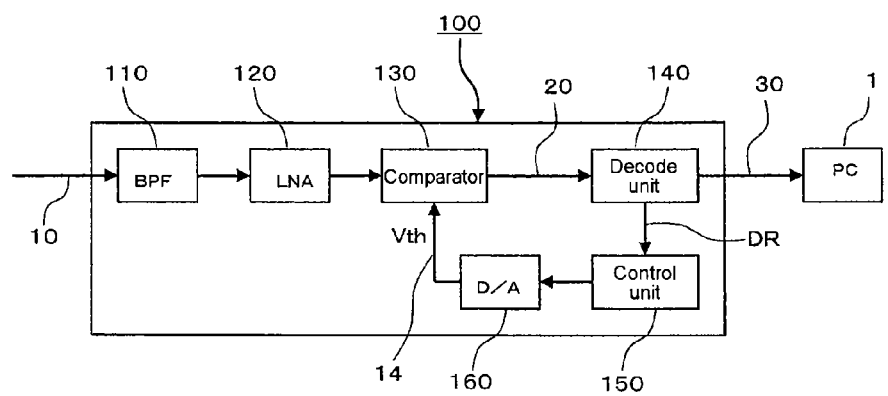
FIG. 1 is a block diagram illustrating the structure of a pulse receiver according to a first embodiment of the present invention.

A pulse receiver according to the first embodiment of the present invention will be described with reference to FIG. 1. FIG. 1 is a block diagram illustrating the structure of the pulse receiver 100 of the present embodiment. The pulse receiver 100 of this embodiment has a band-pass filter (BPF) 110, a low noise amplifier (LNA) 120, a comparator 130, a decode unit 140, a control unit 150 and a D/A converter 160. A burst signal 10, which contains digital information and is sent from a transmitter (not shown) by wire or wireless communications, is affected by noise, attenuation and the like in a transmission channel and then, received by the pulse receiver 100 of this embodiment.

The burst signal 10 received by the pulse receiver 100 contains a pulse train composed of plural pulses and the width of each pulse is several nanoseconds or less. The burst signal 10 is subjected to pulse position modulation (PPM) in which information is modulated by positional relation of the pulse train. The burst signal is, for example, as illustrated in FIGS. 2A and 2B, composed of a pulse pattern 10a corresponding to basic data "1" and a pulse pattern 10b corresponding to basic data "0".

Figure 2A:
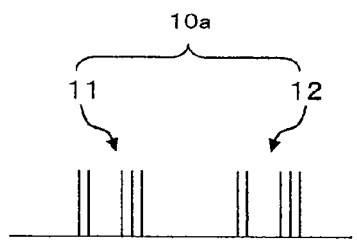
FIGS. 2A and 2B are explanatory views illustrating an example of pulse pattern corresponding to basic data "1" and "0"
Figure 2B:
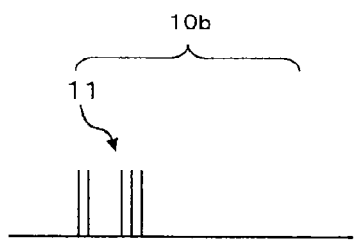

In FIGS. 2A and 2B, two pulse trains 11, 12 are assigned to the pulse pattern corresponding to the basic data "1" of FIG. 2A, and only one pulse pattern 11 is assigned to the pulse pattern corresponding to the basic data "0" of FIG. 2B and no pulse train is assigned to the position corresponding to the pulse train 12 in the pulse pattern of the basic data "1". With this structure, the pulse train 11 is used as a reference and decoding to the basic data "1" or "0" is performed by determining whether the pulse train 12 exists at the predetermined position or not. Here, in FIGS. 2A and 2B, it is assumed that the pulse trains 11 and 12 are same as each other, but they may be different from each other.

The burst signal 10 received by the pulse receiver 100 is first input to the BPF 110, in which the band is restricted. Then, the burst signal 10 is output to the LNA 120. In the LNA 120, the signal output from the BPF 110 is amplified to a fixed level and output to the comparator 130. In the comparator 130, the signal input from the LNA 120 is compared with a reference voltage Vth. When the input signal exceeds the reference voltage Vth, a signal corresponding to "High" is output, while the signal is equal to or less than the reference voltage Vth, a signal corresponding to "Low" is output. In this way, the comparator 130 outputs a pulse train 20 corresponding to received wave profile.

The pulse train 20 output from the comparator 130 is input to the decode unit 140, decoded to basic data "1" or "0" sequentially and output as information 30. In FIG. 1, the pulse receiver 100 is connected to a personal computer (PC) 1 as an external device and the information 30 output from the decode unit 140 is output to the PC 1. Information of the pulse train which is not decoded to the basic data at the decode unit 140 is not output to the external device.

In the pulse receiver 100, in order for the decode unit 140 to decode information appropriately, the pulse train 20 input from the comparator 130 needs to be a precise reproduction of the received burst signal 10. The burst signal 10 input to the pulse receiver 100 has pulse trains 11, 12 as illustrated in FIGS. 2A and 2B. However, when it is affected by attenuation, noise and the like in the transmission channel before being received by the pulse receiver 100, the received burst signal 10 cannot be reproduced precisely by the comparator 130.

Figure 3A:
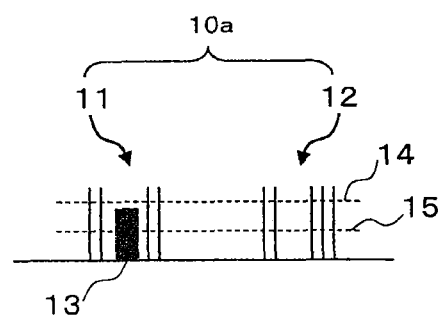
FIGS. 3A and 3B are explanatory views illustrating an example where noise is mixed in a burst signal.
Figure 3B:
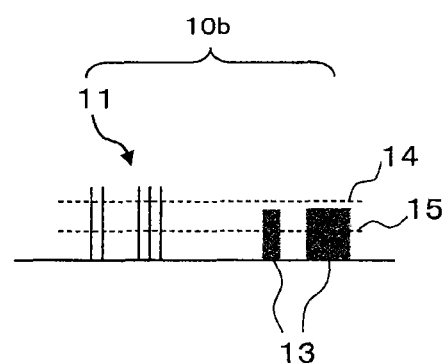

For example, as illustrated in FIGS. 3A and 3B, when noise 13 is mixed in the pulse trains 11, 12 and a signal convoluted with this noise 13 is input to the comparator 130, the noise 13 may be wrongly detected as pulses of the burst signal 10 unless the reference voltage Vth input to the comparator 130 is set appropriately. In the example of FIGS. 3A and 3B, when the used reference voltage Vth is a set value of a code 14, it is possible to decode to the basic data correctly without being affected by the noise 13. However, when the used reference voltage Vth is a set value of a code 15, the noise 13 is judged as pulses and decoded to the basic data wrongly, or as the reproduced pattern does not match either of the pulse patterns shown in FIGS. 2A and 2B, decoding fails. Consequently, in the decode unit 140, the information transmitted in the burst signal 10 cannot be decoded appropriately or decoded to wrong information.

As described above, in order for the decode unit 140 to decode information transmitted in the burst signal 10 appropriately, the reference voltage Vth used in determination threshold of presence or absence of pulses by the comparator 130 needs to be set appropriately. In the pulse receiver 100 of the present embodiment, the information from the decode unit 140 is used as a basis to control the reference voltage Vth to be an appropriate value by the control unit 150. The method for controlling the reference voltage Vth in the pulse receiver 100 will be described below.

The decode unit 140 decodes the pulse train 20 to the information 30 as described above, counts the number of decoding success for a predetermined time interval (count time Ts) and outputs the counted rate (decoding success rate DR) to the control unit 150. The decoding success rate counted at the decode unit 140 is the number of decoding success made for the count time Ts, irrespective of whether the decoded information is correct or not. Here, the decoding success is such that the pulse train input from the comparator 130 is compared with the pulse patterns of basic data stored in advance as illustrated in FIGS. 2A, 2B and determined to coincide with the pulse pattern of basic data "1" or "0". Therefore, wrong decoding such that the pulse pattern is wrongly decoded to "1" instead of "0" due to the noise 13 or the like is regarded as decoding success and the decoding success rate is incremented. On the other hand, if the reproduced pulse pattern does not coincide with the pulse pattern of basic data stored in advance due to the noise 13 or the like and cannot be decoded "1" nor "0", the decoding success rate is not incremented.

The decode unit 140 counts the number of decoding successes mentioned above for the count time Ts (for example, Ts=500 ms) and outputs it as the decoding success rate DR to the control unit 150. The control unit 150 uses as a basis the decoding success rate DR communicated from the decode unit 140 to control the reference voltage used in the comparator 130.

The control unit 150 receives the decoding success rate DR counted for the count time Ts from the decode unit 140 and uses it to calculate a set value of reference voltage Vth output to the comparator 130, which method will be described below.

It is assumed that a target value of the decoding success rate DR suitable for decoding by the decode unit 140 is a decoding target rate $DR_{TGT}$. The decoding target rate $DR_{TGT}$ is expressed by the following equation.

$$DR_{TGT}=Br \times Ts \qquad (1)$$

Here, Br denotes a data transfer rate. As an example, when the data transfer rate Br is 100 kbps and the count time Ts is 500 ms, the decoding target rate $DR_{TGT}$ is 50000.

Here, it is assumed that a difference between the above-mentioned decoding target rate $DR_{TGT}$ and a decoding success rate DR counted by the decode unit 140 is a deviation Err. The deviation Err is obtained by the following equation.

$$Err = DR_{TGT} - DR \quad (2)$$

In the control unit 150, the deviation Err obtained by the above-mentioned equation (2) is used to renew a set value of reference voltage Vth by the following equation (here, it is assumed below that the symbol Vth represents a reference voltage as an analog value supplied to the comparator 130 or a set value (reference voltage) as a target for renewal in the control unit 150, depending on the context).

$$Vthnew = Vth + P \times Err + I \times \Sigma Err \quad (3)$$

Here, Vthnew denotes a renewed set value of reference voltage and Vth denotes a current set value of reference voltage before renewal. And, $\Sigma Err$ is a cumulative value of deviation and P and I are preset constants, that is, a proportional control constant and an integral control constant.

The equation (3) shows the set value of reference voltage Vth is renewed by a proportional component $P \times Err$ and an integral component $I \times \Sigma Err$ of the deviation Err. In renewal of the reference voltage set value Vth based on the equation (3), the set value Vth can be renewed to a suitable value smoothly and stably by setting the proportional control constant P and the integral control constant I appropriately.

The renewed set value of reference voltage Vthnew which is renewed based on the equation (3) is output from the control unit 150 to the D/A converter 160, in which it is converted to an analog signal. This analog signal is output from the D/A converter 160 to the comparator 130 as the reference voltage Vth used in the comparator 130.

Renewal of the set value of reference voltage Vth based on the equation (3) is repeated until the deviation Err becomes equal to or less than a first determination value P1. With this repetition, the set value of reference voltage Vth is controlled to be a suitable value, thereby making it possible to provide a preferable receiver with a minimized BER. As a preferable example, the first determination value P1 is set to 0. In this case, the reference voltage Vth is renewed and controlled so as to prevent failure of decoding by the decode unit 140.

Preferably, a value corresponding to a greater positive voltage value as compared with the amplified (positive) burst signal to be input to the comparator 130 is input as an initial value of the reference voltage set value Vth and the proportional control constant P and the integral control constant I used in the equation (3) are both negative constants. With this setting, the control unit 150 lowers the set value of reference voltage Vth gradually from the initial value thereby to control the deviation Err to be equal to or less than the first determination value P1. The initial value of the reference voltage set value Vth set in the comparator 130 is, for example, 250 mV (see FIG. 5 described later).

Figure 4:
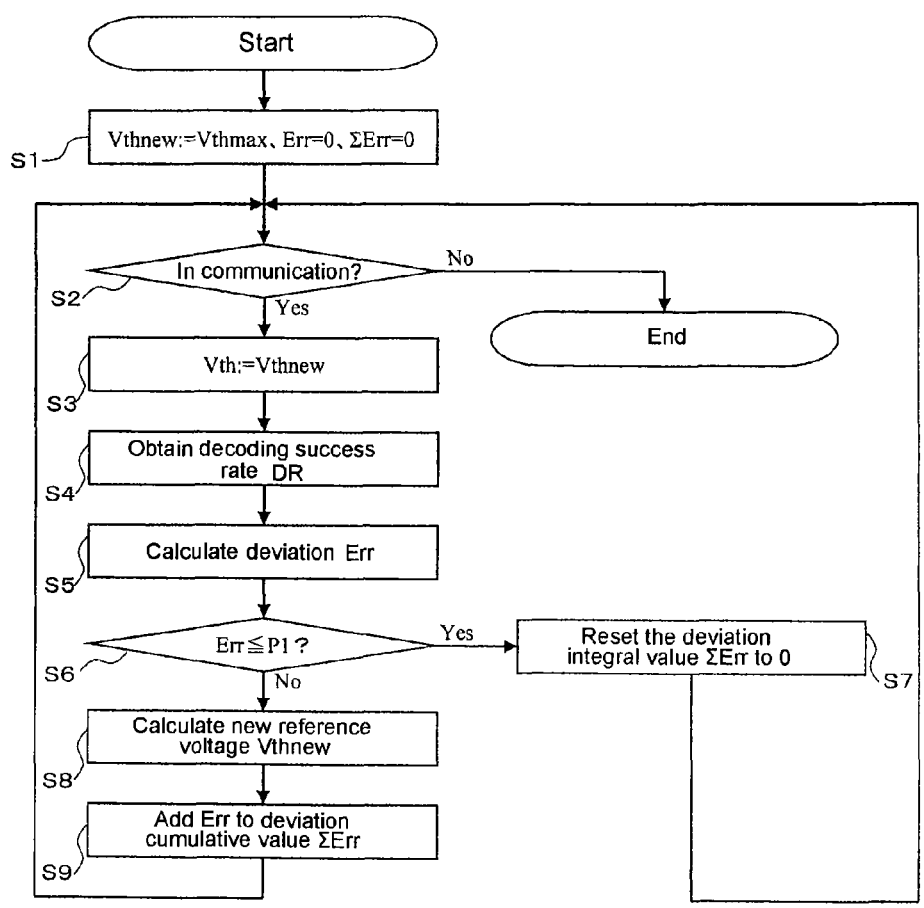
FIG. 4 is a flowchart of control performed by a control unit of the first embodiment.

In the pulse receiver 100 of this embodiment, the flow of control of the control unit 150 for renewing the reference voltage Vth used in the comparator 130 is explained with reference to FIG. 4. FIG. 4 is a flowchart showing the flow of control performed by the control unit 150.

First in the step S1, an initial value is set to a parameter used in control by the control unit 150. First, a set value Vthmax corresponding to a predetermined greater voltage value is set as the initial value to the set value of reference voltage Vthnew output from the control unit 150 to the comparator 130 via the D/A converter 160. Vthmax is a set value corresponding to a greater positive reference voltage as compared with the amplified (positive) burst signal to be input to the comparator 130 as described above. Besides, the deviation Err and the integral value Err are set to 0.

In the step S2, it is determined whether the pulse receiver 100 is in communication or not. Determination whether it is in communication or not is performed by determining whether the burst signal 10 is received or not. When it is determined that the pulse receiver 100 is in communication, it goes to the next step S3. If it is determined that the pulse receiver 100 is not in communication, control is terminated.

In the step S3, a finally renewed set value of reference voltage Vthnew is set to the current set value of reference voltage Vth and output to the D/A converter 160. In the step S4, the decoding success rate DR for the count time Ts is input from the decode unit 140 and in the step S5, the deviation Err is calculated by the equation (2).

In the step S6, it is determined whether or not the deviation Err is equal to or less than the first determination value P1. When the deviation Err is equal to or less than the determination value P1, it goes to the step S7. When the deviation Err is greater than the determination value P1, it goes to the step S8. In the step S7, it is assumed that the decoding success rate DR reaches the decoding target rate $DR_{TGT}$ and therefore, the integral value $\Sigma Err$ of the deviation is reset to 0.

When the process goes to the step S8, the renewed value Vthnew of the reference voltage is calculated by the equation (3). The renewed set value of reference voltage Vthnew is output to the D/A converter 160 in the step S3 of the next cycle and output to the comparator 130 to be used in the reference voltage Vth. In the step S9, the deviation Err calculated in the step S5 is added to the integral value $\Sigma Err$ of the deviation Err accumulated till then and the integral value $\Sigma Err$ is renewed. The renewed integral value $\Sigma Err$ is used in calculation of a renewed value of reference voltage Vthnew in the step S8 of the next cycle.

In the flowchart of FIG. 4, the processing of the steps S2 to S9 is repeated until it is determined in the step S6 that the deviation Err is equal to or less than the first determination value P1. With this repetition, the reference voltage Vth is renewed and controlled such that the decoding success rate DR reaches the decoding target rate $DR_{TGT}$. Consequently, it becomes possible to reduce the BER to the target value or less to decode the burst signal.

Figure 5:
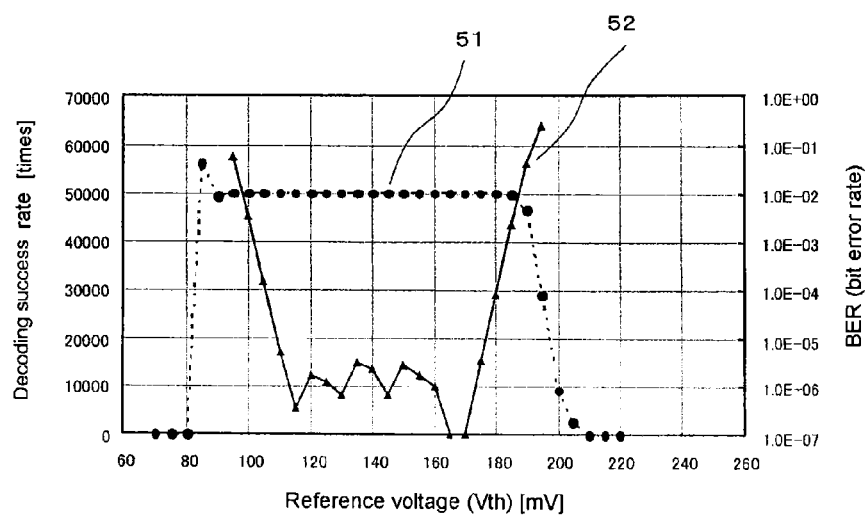
FIG. 5 is a graph showing variations in BER (bit error rate) and decoding success rate when reference voltage is set to various fixed values.

In the pulse receiver 100, variations of BER and decoding success rate DR when the reference voltage Vth is set to various fixed values, instead of being renewed by the control unit 150, are shown in FIG. 5. Here, the BER denotes a ratio of the burst signal 10 which is not decoded to correct information. The decoding success rate DR includes the case of wrong decoding as a success and the BER includes both of the number of failed decoding and the number of wrong decoding. In FIG. 5, it is assumed that the decoding target rate $DR_{TGT}$ is 50000 and the decoding success rate DR is denoted by the reference numeral 51 and the BER is denoted by the reference numeral 52.

As seen from FIG. 5, when the reference voltage Vth is equal to or less than 185 mV, the decoding success rate DR reaches the decoding target rate $DR_{TGT}$. Besides, it is also seen that the BER can be optimized (BER=about $10^{-3}$ or less) required for excellent communication when the reference voltage Vth is 185 mV or less.

As described above, in the pulse receiver 100 of the present embodiment, it is possible to achieve an optimal BER for communication by setting the decoding target rate $DR_{TGT}$ appropriately and controlling the set value of reference voltage Vth by the control unit 150 in such a manner that the decoding success rate DR reaches the decoding target rate $DR_{TGT}$. In the pulse receiver of the present embodiment, it is possible to achieve an optimal BER for reception based on a decoding state of a reception signal without need to add another signal or provide another reception circuit. With this structure, it is possible to provide a pulse receiver which is compact, low-cost and stable in pulse reception performance.

Here, the decoding success rate DR is lowered drastically at the reference voltage Vth of 80 mV or less. This means that noise cannot be processed appropriately when the reference voltage is too low. Besides, the decoding success rate DR is also lowered drastically at the reference voltage exceeding 185 mV. This means that the pulse signal contained in the burst signal cannot be detected when the reference voltage Vth is too high.

Second Embodiment

The structure of a pulse receiver according to a second embodiment of the present invention will be described below. As seen from FIG. 5, the BER is optimized by lowering the reference voltage Vth sequentially from the high level Vthmax and further lowering the reference voltage Vth after the decoding success rate DR reaches the decoding target rate $DR_{TGT}$ at the reference voltage Vth of 185 mV.

Then, in the present embodiment, a predetermined positive offset voltage Voffset is further subtracted from the voltage obtained when the decoding success rate DR reaches the decoding target rate $DR_{TGT}$. In the example shown in FIG. 5, the offset voltage Voffset, for example, 15 mV, is subtracted from the voltage 185 mV obtained when the decoding success rate DR reaches the decoding target rate $DR_{TGT}$, and the reference voltage Vth 170 mV is obtained. Then, the BER is a value (BER=about $10^{-6}$ or less) which is sufficiently lower than the value required for excellent communication (BER=about $10^{-3}$ or less). Here, there is no need to subtract the offset voltage Voffset when the decoding success rate DR reaches the decoding target rate $DR_{TGT}$ and the integral value ΣErr of the deviation is sufficiently low (equal to or less than a second determination value P2 described later).

Figure 6:
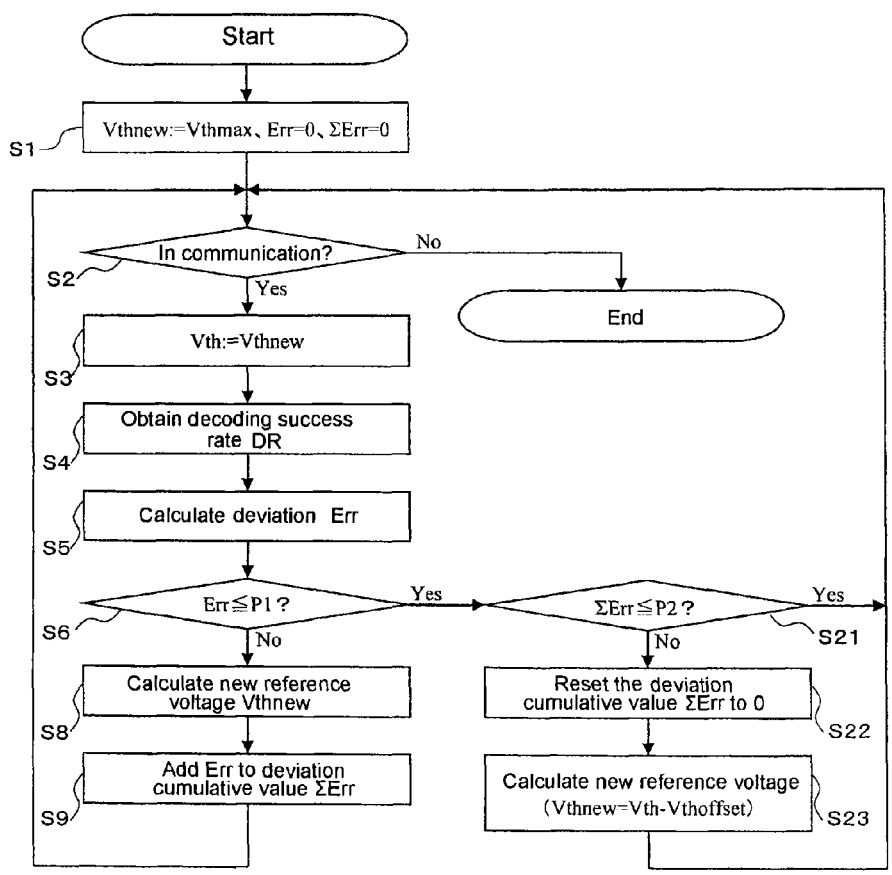
FIG. 6 is a flowchart of control performed by a control unit of a second embodiment.

The flow of processing of the control unit 150 in the second embodiment will be described with reference to FIG. 6. FIG. 6 is a flowchart showing the flow of control performed by the control unit 150. In this embodiment, the processing performed when it is determined the deviation Err is equal to or less than the first determination value P1 in the step S6 is different from that in the first embodiment shown in the flowchart of FIG. 4. That is, when it is determined in the step S6 that the deviation Err is equal to or less than the first determination value P1, it is then determined in the step S21 whether the integral value ΣErr of the deviation is equal to or less than a second determination value P2. Here, the second determination value P2 is set to 0 or more.

When in the step S21, it is determined that the integral value ΣErr of the deviation is equal to or less than the second determination value P2, the processing is terminated without calculating of the renewed value Vthnew of the reference voltage by the control unit 150. In this case, the renewed value Vthnew used till then is not renewed further and output to the D/A converter 160 in the step S3.

On the other hand, when it is determined that the integral value ΣErr of the deviation is greater than the second determination value P2, the integral value ΣErr of the deviation is reset to 0 in the step S22 and the set value of reference voltage is renewed by the following equation in the step S23.

$$V\text{thnew}=V\text{th}-V\text{offset} \quad (4)$$

This reference voltage Vthnew is output to the D/A converter in the step S3 and set and used in the comparator 130.

Figure 7:
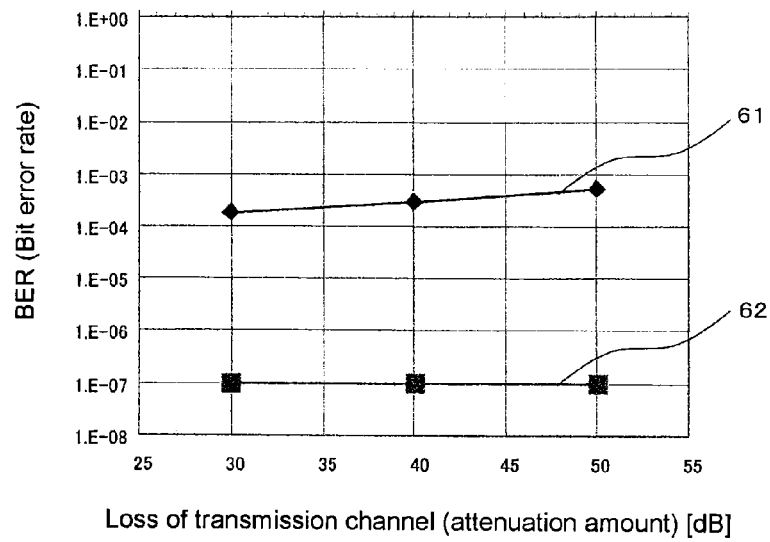
FIG. 7 is a graph showing comparison of BER between the reference voltage of the first embodiment and the reference voltage of the second embodiment.

As described above, in the second embodiment, the positive offset voltage Voffset is subtracted from the reference voltage obtained in the first embodiment, which makes it possible to decode information with a smaller BER than that of the first embodiment. FIG. 7 illustrates comparison results of BER between use of the reference voltage calculated in the first embodiment from which the offset voltage Voffset is not subtracted and use of the reference voltage calculated in the second embodiment from which the offset voltage Voffset is subtracted.

In FIG. 7, the horizontal axis indicates loss (attenuation amount) in the burst signal 10 in the transmission channel and the vertical axis indicates the BER. The BER when the reference voltage of the first embodiment is used is denoted by the reference numeral 61 and the BER when the reference voltage of the second embodiment is used is denoted by the reference numeral 62. Besides, the positive offset voltage Voffset subtracted in the second embodiment is 15 mV. As illustrated in FIG. 7, the BER is reduced drastically when using the reference voltage of the second embodiment from which the offset voltage Voffset is subtracted, irrespective of loss in the burst signal 10 in the transmission channel.

Figure 8:
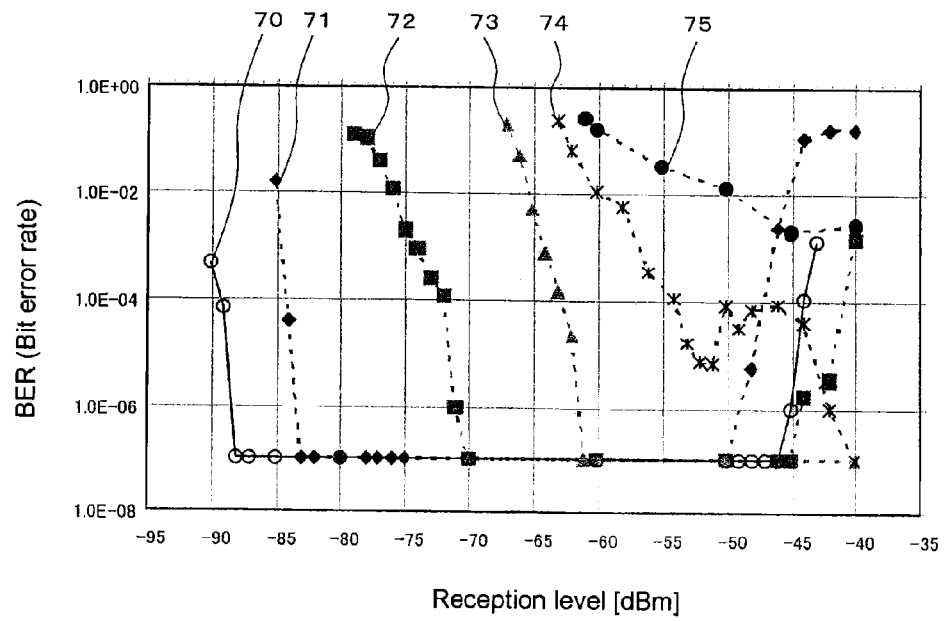
FIG. 8 is a graph showing BER when the reception level of the burst signal varies.

Variations of BER in accordance with the reception level of the burst signal 10 when the reception level is changed by varying the state of the transmission channel is shown in FIG. 8 by way of comparison between the case of the second embodiment applied and the case of the second embodiment not applied. Here, a fixed value is used as the reference voltage Vth when the second embodiment is not applied. In FIG. 8, the reference numeral 70 denotes the BER when the second embodiment is applied and reference numerals 71 to 75 denote the BER when the reference voltages Vth is fixed to 120 mV, 160 mV, 180 mV, 190 mV, 195 mV, respectively. As seen from FIG. 8, when the second embodiment is applied, the BER is reduced over a wide range of reception levels as compared with the case where any of these fixed values is used as reference voltage, and excellent decoding of the burst signal 10 is realized.

As described above, in the second embodiment, as the positive offset voltage Voffset is subtracted from the reference voltage such that the decoding success rate DR reaches the decoding target rate $DR_{TGT}$, it is possible to reduce the BER more. In the pulse receiver of this embodiment, it is possible to achieve more preferable BER for reception than that in the first embodiment and there is no need to add another signal or provide another reception circuit. With this structure, it is possible to provide a pulse receiver which is compact size, low-cost and stable in pulse reception performance.

Here, the embodiments have been described by way of example of the pulse receiver of the present invention and are not limited to this example. The detail structure and operations of the pulse receiver according to the embodiments may be modified appropriately without departing from the scope of the present invention.

REFERENCE NUMERALS 100 pulse receiver
110 band-pass filter
120 low noise amplifier
130 comparator
140 decode unit
150 control unit
160 D/A converter

The invention claimed is:

1. A pulse receiver for receiving a burst signal containing information to transfer and decoding and outputting the information, comprising:
   a comparator provided for comparing the burst signal with a reference voltage and outputting a pulse train corresponding to the burst signal;
   a decode unit provided for receiving the pulse train from the comparator, decoding the pulse train to predetermined basic data sequentially and outputting the data as the information, and counting, for a predetermined count time, a decoding success rate which is a number of times of decoding of the pulse train to the basic data; and
   a control unit provided for receiving the decoding success rate from the decode unit, calculating a deviation by subtracting the decoding success rate from a predetermined decoding target rate, when the deviation is greater than a predetermined first determination value that is equal to or greater than 0, renewing a set value of the reference voltage so as to reduce the deviation and outputting the set value to the comparator, and repeating renewal of the set value of the reference voltage until the deviation becomes equal to or less than the first determination value, wherein,
   when the deviation is greater than the first determination value, the control unit renews the set value by adding, to the set value, a proportional component obtained by multiplying the deviation by a predetermined proportional control constant and an integral component obtained by multiplying a cumulative value of the deviation by a predetermined integral control constant, and
   when the deviation is equal to or less than the first determination value and the cumulative value of the deviation is greater than a predetermined second determination value that is equal to or greater than 0, the control unit subtracts an offset value corresponding to an offset voltage from the set value and resets the cumulative value of the deviation to 0.

2. The pulse receiver of claim 1, wherein the control unit sets, as an initial value, a set value of the reference voltage that is positive and greater as compared with the burst signal input to the comparator, the proportional control constant and the integral control constant are negative, and the offset voltage is positive.

3. A method for receiving a burst signal, comprising:
   (a) receiving the burst signal containing information to transfer;
   (b) comparing the burst signal with a reference voltage and generating a pulse train corresponding to the burst signal;
   (c) decoding the pulse train to predetermined basic data sequentially and outputting the data as the information, and counting, for a predetermined count time, a decoding success rate which is a number of times of decoding of the pulse train to the basic data; and
   (d) calculating a deviation by subtracting the decoding success rate from a predetermined decoding target rate, when the deviation is greater than a predetermined first determination value that is equal to or greater than 0, renewing a set value of the reference voltage so as to reduce the deviation and setting the reference voltage to the set value,
   wherein the steps (a) to (d) are repeated until the deviation becomes equal to or less than the first determination value, wherein,
   in the step (d), when the deviation is greater than the first determination value, the set value is renewed by adding, to the set value, a proportional component obtained by multiplying the deviation by a predetermined proportional control constant and an integral component obtained by multiplying a cumulative value of the deviation by a predetermined integral control constant, and
   the method further comprises (e), when the deviation is equal to or less than the first determination value and the cumulative value of the deviation is greater than a predetermined second determination value that is equal to or greater than 0, subtracting an offset value corresponding to an offset voltage from the set value and resetting the cumulative value of the deviation to 0.

4. The method of claim 3, wherein,
   in the step (d), when the deviation is greater than the first determination value, the set value is renewed by adding, to the set value, a proportional component obtained by multiplying the deviation by a predetermined proportional control constant and an integral component obtained by multiplying a cumulative value of the deviation by a predetermined integral control constant.

5. The method of claim 4, wherein a set value of the reference voltage that is positive and greater as compared with the burst signal is set as an initial value of the set value, and the proportional control constant and the integral control constant are negative.

6. The method of claim 3, wherein a set value of the reference voltage that is positive and greater as compared with the burst signal is set as an initial value of the set value, the proportional control constant and the integral control constant are negative, and the offset voltage is positive.

* * * * *